United States Patent
Patscheider

(10) Patent No.: US 11,539,097 B2
(45) Date of Patent: Dec. 27, 2022

(54) BATTERY HOUSING FOR A HIGH-VOLTAGE BATTERY OF A MOTOR VEHICLE, HIGH-VOLTAGE BATTERY AND MOTOR VEHICLE

(71) Applicant: Bayerische Motoren Werke Aktiengesellschaft, Munich (DE)

(72) Inventor: Julian Patscheider, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 295 days.

(21) Appl. No.: 16/963,612

(22) PCT Filed: Apr. 5, 2019

(86) PCT No.: PCT/EP2019/058593
§ 371 (c)(1),
(2) Date: Jul. 21, 2020

(87) PCT Pub. No.: WO2019/214881
PCT Pub. Date: Nov. 14, 2019

(65) Prior Publication Data
US 2021/0066684 A1    Mar. 4, 2021

(30) Foreign Application Priority Data

May 8, 2018   (DE) ..................... 10 2018 207 151.9

(51) Int. Cl.
*H01M 50/249*   (2021.01)
*H01M 50/20*    (2021.01)
(Continued)

(52) U.S. Cl.
CPC ......... *H01M 50/249* (2021.01); *H01M 50/20* (2021.01); *H01M 50/209* (2021.01); *H01M 50/291* (2021.01); *H01M 2220/20* (2013.01)

(58) Field of Classification Search
None
See application file for complete search history.

(56) References Cited

U.S. PATENT DOCUMENTS

2012/0129029 A1   5/2012  Yi et al.
2015/0255764 A1   9/2015  Loo et al.
(Continued)

FOREIGN PATENT DOCUMENTS

CN   101830161 A   9/2010
CN   102476578 A   5/2012
(Continued)

OTHER PUBLICATIONS

Chinese-language Office Action issued in Chinese Application No. 201980006791.X dated Mar. 1, 2022 with English translation (14 pages).

(Continued)

*Primary Examiner* — Gregg Cantelmo
(74) *Attorney, Agent, or Firm* — Crowell & Moring LLP

(57) ABSTRACT

A battery housing for a high-voltage battery of a motor vehicle has a housing interior for receiving a multiplicity of battery modules. The housing interior is formed by a housing upper part and a housing lower part covering the housing upper part. The housing lower part is formed as a segmented housing base with at least two separate housing base segments, of which at least one housing base segment is designed to be removable for opening the battery housing and for allowing access to a part region of the housing interior covered by this housing base segment, and to that end is secured to the housing upper part in a non-destructively removable manner.

11 Claims, 4 Drawing Sheets

(51) Int. Cl.
    *H01M 50/291*     (2021.01)
    *H01M 50/209*     (2021.01)

(56) References Cited

U.S. PATENT DOCUMENTS

| | | | |
|---|---|---|---|
| 2016/0276638 A1* | 9/2016 | Sham | B60L 50/66 |
| 2017/0267089 A1 | 9/2017 | Sugizaki et al. | |
| 2018/0006345 A1 | 1/2018 | Murata et al. | |
| 2018/0013105 A1* | 1/2018 | Wuensche | H01M 10/613 |
| 2018/0013110 A1 | 1/2018 | Wuensche et al. | |
| 2018/0050607 A1* | 2/2018 | Matecki | B60L 50/66 |
| 2018/0111501 A1 | 4/2018 | Takeuchi et al. | |

FOREIGN PATENT DOCUMENTS

| | | |
|---|---|---|
| CN | 104900825 A | 9/2015 |
| CN | 205452390 U | 8/2016 |
| DE | 10 2017 210 633 A1 | 1/2018 |
| EP | 3 267 508 A1 | 1/2018 |

OTHER PUBLICATIONS

International Search Report (PCT/ISA/210) issued in PCT Application No. PCT/EP2019/058593 dated Jun. 21, 2019 with English translation (five pages).

German-language Written Opinion (PCT/ISA/237) issued in PCT Application No. PCT/EP2019/058593 dated Jun. 21, 2019 (six pages).

German-language Office Action issued in German Application No. 10 2018 207 151.9 dated Feb. 14, 2019 (four pages).

* cited by examiner

BATTERY HOUSING FOR A HIGH-VOLTAGE BATTERY OF A MOTOR VEHICLE, HIGH-VOLTAGE BATTERY AND MOTOR VEHICLE

BACKGROUND AND SUMMARY OF THE INVENTION

The invention relates to a battery housing for a high-voltage battery of a motor vehicle, having a housing interior space for receiving a multiplicity of battery modules, wherein the housing interior space is formed by a housing upper part and a housing lower part which covers the housing upper part. The invention moreover relates to a high-voltage battery as well as to a motor vehicle.

The focus is presently directed toward high-voltage batteries or high-voltage accumulators, respectively, which can in particular serve as traction batteries for the supply of energy to an electric drive machine of a motor vehicle configured as an electric vehicle or a hybrid vehicle. Such high-voltage batteries usually comprise a multiplicity of interconnected battery modules which are disposed in a housing interior space of a battery housing. The battery housings herein usually have a housing upper part and a housing lower part. The housing lower part is typically configured as a plate-shaped housing base or underbody, respectively, the dimensions thereof corresponding to a total area of the battery housing. The housing base is usually welded to the housing upper part, wherein the welded battery housing is linked to the body of the motor vehicle.

In an event which is critical to the high-voltage battery, for example in the event of an accident of the motor vehicle or when driving over an obstacle close to the ground, it can arise that the battery housing and the battery modules are damaged. In order for damage to the battery modules in the housing interior space to be identified, the high-voltage battery is usually completely uninstalled and the battery housing opened in a workshop since the housing interior space of the high-voltage battery is not accessible from the outside. Moreover, a replacement of the housing base results in high material costs, even when the housing base has only been damaged in regions.

It is an object of the present invention to provide a high-voltage battery in which all of the components are rapidly and readily accessible.

This object is achieved according to the invention by a battery housing, by a high-voltage battery, as well as by a motor vehicle having the features according to the respective independent patent claims. Advantageous embodiments of the invention are the subject matter of the dependent patent claims, of the description, as well as of the figures.

A battery housing according to the invention for a high-voltage battery of a motor vehicle has a housing interior space for receiving a multiplicity of battery modules, wherein the housing interior space is formed by a housing upper part and a housing lower part which covers the housing upper part. Moreover, the housing lower part is configured as a segmented housing base having at least two separate housing base segments. At least one housing base segment of the at least two housing base segments is configured so as to be removable for opening the battery housing and for rendering accessible a sub-region of the housing interior space that is covered by this housing base segment and to this end is fastened so as to be releasable in a non-destructive manner on the housing upper part.

The battery housing of the high-voltage battery serves for receiving the interconnected battery modules which in turn can have a multiplicity of interconnected, in particular prismatic, battery cells. The battery modules within the housing interior space herein can be disposed beside one another and/or stacked on top of one another. In order for the high-voltage battery to be installed in the motor vehicle, the battery housing can be fastened to a body of the motor vehicle, wherein the housing base or the underbody, respectively, in the installed state of the high-voltage battery faces a carriageway of the motor vehicle. The housing upper part of the battery housing can have lateral walls which extend in a longitudinal direction of the battery housing that corresponds to a vehicle longitudinal direction, for example. These lateral walls can be fastened to rocker panels of the motor vehicle in order for the battery housing to be linked to the body of the motor vehicle, for example.

The battery housing moreover has the segmented housing base which has the mutually separate housing base segments or housing base parts, respectively. The housing base segments are in each case plate-shaped portions which are configured so as to be mutually separate and are disposed on the housing upper part. The housing base is thus configured in multiple parts. In particular, the housing base segments are configured as plate-shaped rectangular portions which extend across a width of the battery housing and which are disposed beside one another in a longitudinal direction of the battery housing that corresponds to a vehicle longitudinal direction. On account of the rectangular housing base segments which are configured beside one another and so as to be mutually contiguous, a total area of the housing base is configured so as to be rectangular. Each housing base segment covers an assigned sub-region of the housing interior space. In other words, each sub-region is delimited by a region of the housing upper part as well as by the assigned housing base segment. At least one battery module is disposed in each sub-region of the housing interior space, for example. At least one of the housing base segments herein is releasable from the housing upper part in a non-destructive or reversible manner, respectively. This means that the housing segment can be released and removed, or retrieved, respectively, from the housing upper part, and can also be placed onto the housing upper part and fixed or fastened there, respectively, in a non-destructive manner even multiple times. It can be provided that all housing base segments are fastened in a removable manner on the housing upper part and to this end so as to be releasable in a non-destructive manner.

On account of the at least one removable housing base segment, the sub-region of the housing interior space that is covered by this housing base segment can be exposed or covered, respectively. To this end, the motor vehicle having the installed high-voltage battery can be disposed on a vehicle hoist and the removable housing base segment be removed. The battery housing can also be open from below. On account thereof, the associated sub-region of the housing interior space is now accessible from the outside. For example, in the case of driving over an obstacle, for example a bollard, in which the housing base has been damaged in regions, only the damaged housing base segment can be removed and replaced. In the removed state of the damaged housing base segment the associated sub-region of the housing interior space can additionally be checked. For example, it can be checked whether the battery modules disposed in this sub-region have likewise been damaged by driving over the obstacle. If so, these battery modules can be replaced in a simple manner, without completely uninstalling the high-voltage battery.

The housing interior space of the battery housing is rapidly and readily accessible on account of the at least one removable housing base segment. The battery housing as well as components in the housing interior space can thus be checked in a targeted manner for damage after an accident of the motor vehicle. On account of the modular construction of the battery housing, only the damaged parts can advantageously be replaced in this instance.

In one embodiment of the invention, at least one of the housing base segments is fastened to the housing upper part so as not to be releasable in a non-destructive manner, in particular in a materially integral manner. The at least one removable housing base segment is disposed in a sub-region of the battery housing that is exposed to an impingement by a force caused by an impact. For example, this non-removal housing segment for connecting to the housing upper part in a materially integral manner can be welded to the housing upper part. Moreover, only those housing base segments which are disposed in the sub-regions exposed to an impingement by a force caused by an impact and thus at locations of the battery housing that are at risk of damage are in particular configured so as to be removable. Such sub-regions can be, for example, a front region of the battery housing that faces the front of the vehicle and/or a rear region of the battery housing that faces the rear of the vehicle. Only those housing base segments which are disposed so as to be contiguous to a front wall and/or a rear wall of the battery housing are thus configured so as to be removable. Battery modules at risk in the front region and/or the rear region of the battery housing are thus readily accessible, on the one hand. On the other hand, the battery housing, on account of the housing base segments that are connected in a materially integral manner, is configured so as to be particularly low-maintenance.

It proves advantageous for the housing base segments to have dissimilar stiffnesses. In particular, a first housing base segment is configured having a first thickness and on account thereof has a first stiffness, and a second housing base segment is configured having a second thickness which is greater in comparison to the first thickness and has a second stiffness which is greater in comparison to the first stiffness. The housing base is reinforced in a targeted manner at specific locations on account of the dissimilar stiffnesses of the housing base segments. Such specific locations may be the regions which are exposed to the impingement by a force caused by an impact and which are at particular risk of damage in the event of a crash or an accident, respectively, of the motor vehicle, or when driving over an obstacle. Housing base segments which are situated at those locations can thus configured having a greater stiffness than housing base segments in which damage caused by an impact is rather improbable. For example, the housing base segments for configuring the greater stiffness can have a greater thickness and/or a more stable material than the other housing base segments having the lesser stiffness.

On account of only specific housing base segments of the housing base being reinforced in a targeted manner and being configured having a greater material thickness, for example, it can advantageously be prevented that the battery housing has an unnecessary heavy weight. Moreover, by virtue of the design embodiment of the battery housing as a modular system, a targeted reinforcement of the underbody can also be retrofitted in a simple manner without complexity. In other words, housing base segments can also be subsequently removed and, in order for the housing base to be reinforced in a targeted manner, be replaced by housing base segments having a greater stiffness.

In one refinement of the invention the housing upper part has the housing casing which is formed by a front wall, a rear wall and two lateral walls which lie opposite one another in a width direction of the battery housing, a housing cover, and cross braces which, for holding the battery modules, are oriented in the width direction and fastened to internal sides of the lateral walls, wherein the housing base segments are fastened to the housing casing and to the cross braces. In particular, the sub-regions of the housing interior space in a longitudinal direction of the battery housing are delimited by two cross braces and/or by one cross brace and the front wall and/or by one cross brace and the rear wall, and each sub-region is covered by a housing base segment which is fastened to the housing casing and to the at least one associated cross brace.

The housing casing has the front wall that faces the front of the vehicle and the rear wall that faces the rear of the vehicle. The front wall and the rear wall are disposed so as to be spaced apart in the longitudinal direction of the battery housing that corresponds to the vehicle longitudinal direction. The lateral walls extend along the longitudinal direction and, for fastening the high-voltage battery to the motor vehicle, can be mechanically connected to rocker panels, or vehicle longitudinal rails, respectively, for example. A wall thickness, or thickness of the lateral walls, respectively, herein can be adapted to the battery modules used for the high-voltage battery. For example, the wall thickness in a high-voltage battery having battery modules with a high energy content may be greater than in a high-voltage battery having battery modules with a lower energy content. The battery modules in the event of a lateral crash, or in the event of a lateral impact, respectively, can thus be correspondingly protected. The housing casing has an end side which along a vertical direction of the battery housing is directed downward, and an end side which is directed upward. The housing cover is fastened, for example welded or screwed, to the end side which is directed upward. A vertical profile of the housing cover herein can be predefined by a vertical profile of a foot well of a passenger cabin below which the high-voltage battery is disposed.

The cross braces in the housing interior space extend in the width direction that corresponds to the vehicle transverse direction, wherein the cross braces at the ends thereof are fastened to the internal sides of the lateral walls. The cross braces can be welded to the internal sides of the lateral walls, for example. The cross braces herein are disposed so as to be mutually spaced apart along the longitudinal direction of the battery housing. The cross braces are strip-shaped holding elements to which the battery modules are fastened and on which said battery modules can be held. In the removed state of a housing base segment, the exposed accessible battery modules are fastened to the cross brace and securely held on the latter.

In a front region of the battery housing, a first sub-region of the housing internal space is delimited by the front wall, by portions of the lateral walls, and by a cross brace. Downward-pointing end sides of the front wall, of the portions of the lateral walls, and of the cross brace form a frame to which a housing base segment can be fastened. In a rear region of the battery housing, a second sub-region of the housing interior space is formed by the rear wall, by portions of the lateral walls, and by a cross brace. Downward-pointing end sides of the rear wall, of the portions of the lateral walls, and of the cross brace likewise form a frame to which a further housing base segment can be fastened. Further sub-regions of the housing interior space in a central region of the battery housing can in each case be delimited by two cross braces and by portions of the lateral walls. Downward-pointing end sides of the portions of the lateral walls and of the cross braces can likewise configure a frame to which housing base segments can be fastened.

The housing interior space along the vehicle longitudinal direction is thus subdivided into the sub-regions which by removable housing base segments can be closed separately from one another.

It can be provided that the lateral walls have a profile which varies along a longitudinal direction of the battery housing that corresponds to a vehicle longitudinal direction and by way of which lateral wall regions of the battery housing have dissimilar stiffnesses. The lateral walls can be formed by an extruded profile, for example. For example, the lateral wall regions can have dissimilar wall thicknesses along the longitudinal direction. Those lateral wall regions which are particularly at risk of lateral crashes of the motor vehicle can thus be reinforced in a targeted manner with a view to protecting the battery modules.

The at least one removable housing base segment is preferably fastened to the housing upper part by means of a screw connection. In particular, the housing base segment on the periphery thereof is fastened in an encircling manner with screws to the downward-pointing end sides of the housing casing as well as of the cross braces. The at least one housing base segment, by means of screws, can thus be assembled on the housing upper part from below, and can be disassembled again by releasing the screws. A particularly good tightness in the closed state of the battery housing can be achieved by means of screws, on the one hand. On the other hand, screws permit particularly simple releasing in order for the housing base segment to be removed. Additionally, a sealing element, for example a sealing ring or a sealing foam, can be disposed between the periphery and the end sides in order for the battery housing to be sealed in the closed state.

In one refinement of the invention the battery housing, for protecting the high-voltage accumulator in relation to a collision with an obstacle when the motor vehicle drives over the obstacle, has a protective guard. Such a protective guard is in particular a skid plate which is fastened to the front region and/or to the rear region of the battery housing. For example, the skid plate can be fastened to the front wall, or to the housing base segment disposed at the front side, and/or to the rear wall, or to the housing base segment disposed at the rear side. The skid plate, in the event of driving over an obstacle close to the ground, serves in "lifting" or sliding, respectively, the motor vehicle over this obstacle such that the battery housing and thus the high-voltage battery do not collide directly with the obstacle. Additionally however, the skid plate can also fulfill functions in a front impact and/or a rear impact of the motor vehicle and contribute toward the stiffness of the vehicle. The protective guard can be made of aluminum or steel, for example.

The invention moreover relates to a high-voltage battery for a motor vehicle, having a multiplicity of battery modules and a battery housing according to the invention, or an embodiment of the latter. The high-voltage battery can serve as a traction battery for a motor vehicle which can be electrically driven. The battery modules can be configured in the shape of blocks and have an interconnected assembly of stacked prismatic battery cells.

A motor vehicle according to the invention comprises a high-voltage battery according to the invention. The motor vehicle is in particular configured as a passenger motor vehicle in the form of an electric vehicle or a hybrid vehicle.

The embodiments presented with reference to the battery housing according to the invention, and the advantages of these embodiments, apply in analogous manner to the high-voltage battery according to the invention as well as to the motor vehicle according to the invention.

Further features of the invention are derived from the claims, from the figures, and from the description of the figures. The features and combinations of features mentioned above in the description, as well as the features and combinations of features mentioned hereunder in the description of the figures and/or shown only in the figures can be used not only in the respective specified combination but also in other combinations or individually.

The invention will now be explained in more detail by means of a preferred exemplary embodiment and with reference to the drawings.

Identical as well as functionally equivalent elements are provided with the same reference signs in the figures.

DETAILED DESCRIPTION OF THE DRAWINGS

Figure 1:
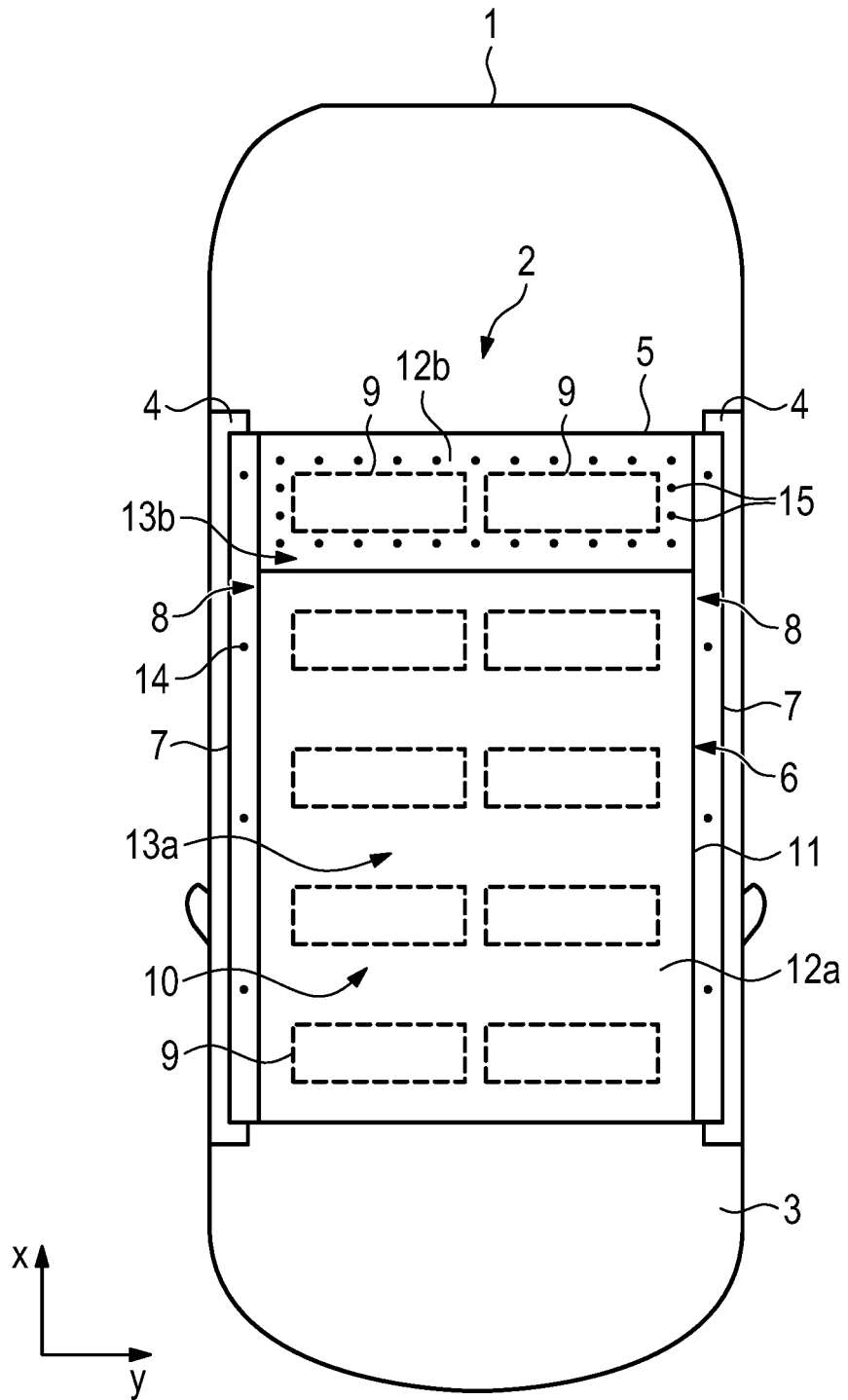
FIG. 1 is a schematic illustration of a motor vehicle having a first embodiment of a high-voltage battery according to the invention.
Figure 2:
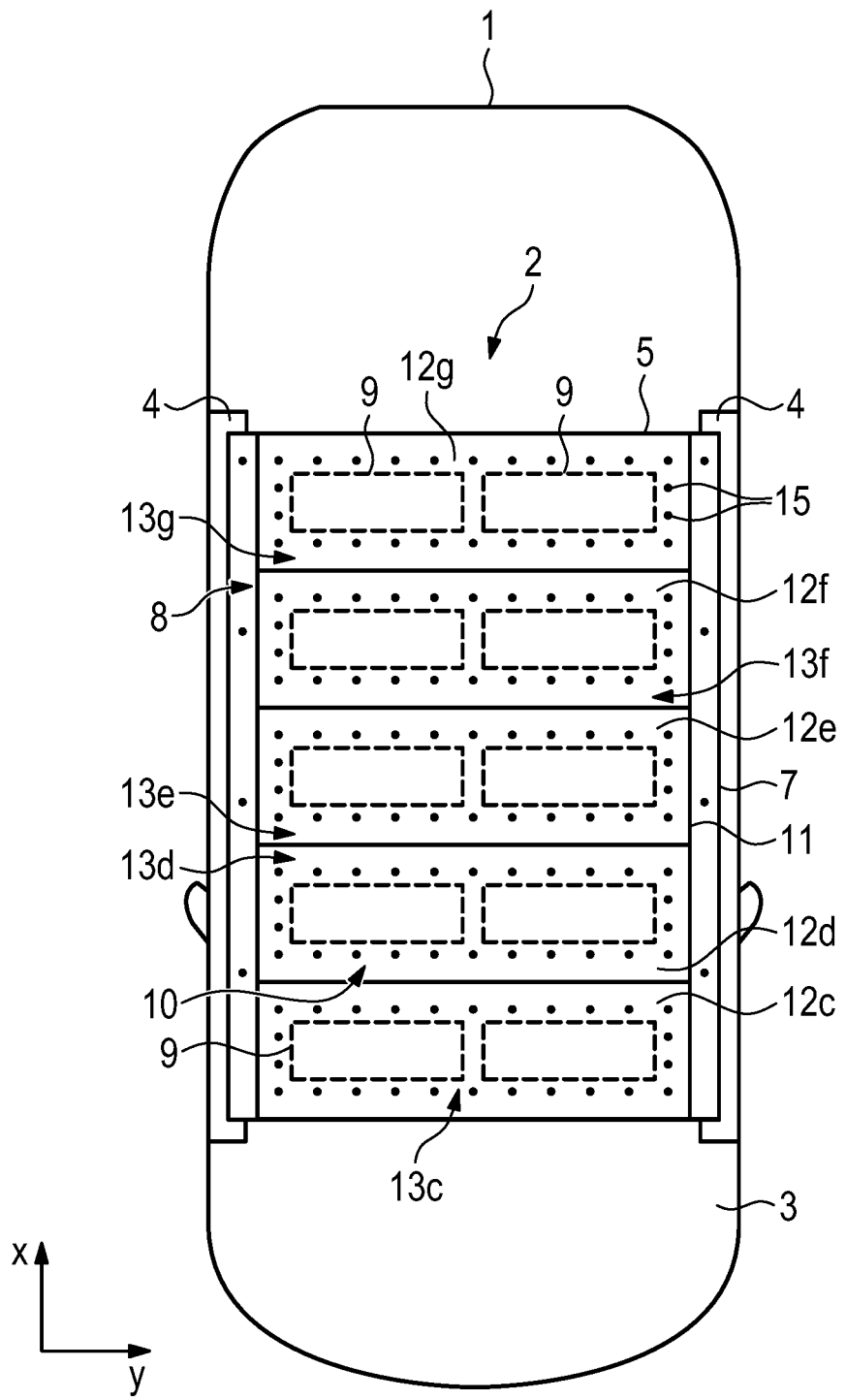
FIG. 2 is a schematic illustration of a motor vehicle having a second embodiment of a high-voltage battery according to the invention.

FIG. 1 and FIG. 2 show from below a motor vehicle 1 according to an embodiment of the present invention. The motor vehicle 1 has a high-voltage battery 2 which here is configured as a traction battery for providing electric energy for a drive motor (not shown here) of the motor vehicle 1 that can be electrically driven. The high-voltage battery 2 here is fastened to rocker panels 4 of the motor vehicle 1 in an underbody region 3 of the motor vehicle 1. The rocker panels 4 extend along a vehicle longitudinal direction x. The high-voltage battery 2 has a battery housing 5 of which only a housing lower part 6 as well as lateral walls 7 of a housing upper part 8 are illustrated here. The lateral walls 7 here are fastened to the rocker panels 4 by way of a screw connection 14. The housing lower part 6 covers battery modules 9 of the high-voltage battery 2 which are disposed in a housing interior space 10 of the battery housing 5 and are illustrated so as to be visible in the schematic illustrations according to FIG. 1 and FIG. 2. Here, two battery modules 9 are in each case disposed beside one another in a vehicle transverse direction y, and five pairs of battery modules 9 are disposed behind one another in the vehicle longitudinal direction x. The housing interior space 10 is completely delimited by the housing upper part 8 and the housing lower part 6.

The housing lower part 6 is configured as a segmented housing base 11. According to FIG. 1, the housing base 11 has two separate housing base segments 12a, 12b. According to FIG. 2, the housing base 11 has five separate housing base segments 12c, 12d, 12e, 12f, 12g. The housing base segments 12a to 12g are in each case disposed behind one another in the vehicle longitudinal direction x which corresponds to a longitudinal direction of the battery housing 5. The housing base segments 12a to 12g are configured as plate-shaped rectangular portions such that a total area of the housing base 11 is configured so as to be rectangular.

At least one of the housing base segments 12a, 12b, and 12c to 12g herein is configured so as to be removable and to this end is fastened so as to be releasable in a non-destructive manner on the housing upper part 8. According to FIG. 1, the housing base segment 12b is configured so as to be removable, while, in contrast, the housing base segment 12a is fastened so as not to be releasable in a non-destructive manner on the housing upper part 8. The housing base segment 12a can be welded to the housing upper part 8, for example. The housing base segment 12b can be fastened to the housing upper part 8 by means of a screw connection 15 that is releasable in a non-destructive manner, for example. According to FIG. 2, all housing base segments 12c, 12d, 12e, 12f, 12g are configured so as to be removable separately from one another and are fastened to the housing upper part 8 so as to be releasable in a reversible manner by means of screw connections 15.

One sub-region 13a, 13b, 13c, 13d, 13e, 13f, 13g of the housing interior space 10 is covered by each housing base segment 12a, 12b, 12c, 12d, 12e, 12f, 12g. According to FIG. 1, four pairs of battery modules 9 are disposed in the sub-region 13a. One pair of battery modules 9 is disposed in the sub-region 13b. According to FIG. 2, one pair of battery modules 9 is in each case disposed in each sub-region 13c, 13d, 13e, 13f, 13g. On account of the releasable housing base segments 12b, 12c, 12d, 12e, 12f, 12g, the associated sub-regions 13b, 13c, 13d, 13e, 13f, 13g of the housing interior space 10 can be separately opened such that the battery modules 9 disposed in these sub-regions 13b, 12c, 13d, 13e, 13f, 13g are accessible from the outside. For example, when one of the housing base segments 12b, 12c, 12d, 12e, 12f, 12g, for example the housing base segment 12e, is damaged in the event of an accident or when driving over an obstacle close to the ground, only this housing base segment 12e can thus be replaced. Moreover, the battery modules 9 which are disposed in the sub-region 13e assigned to the housing base segment 12e can be checked for damage and optionally replaced.

Figure 3:
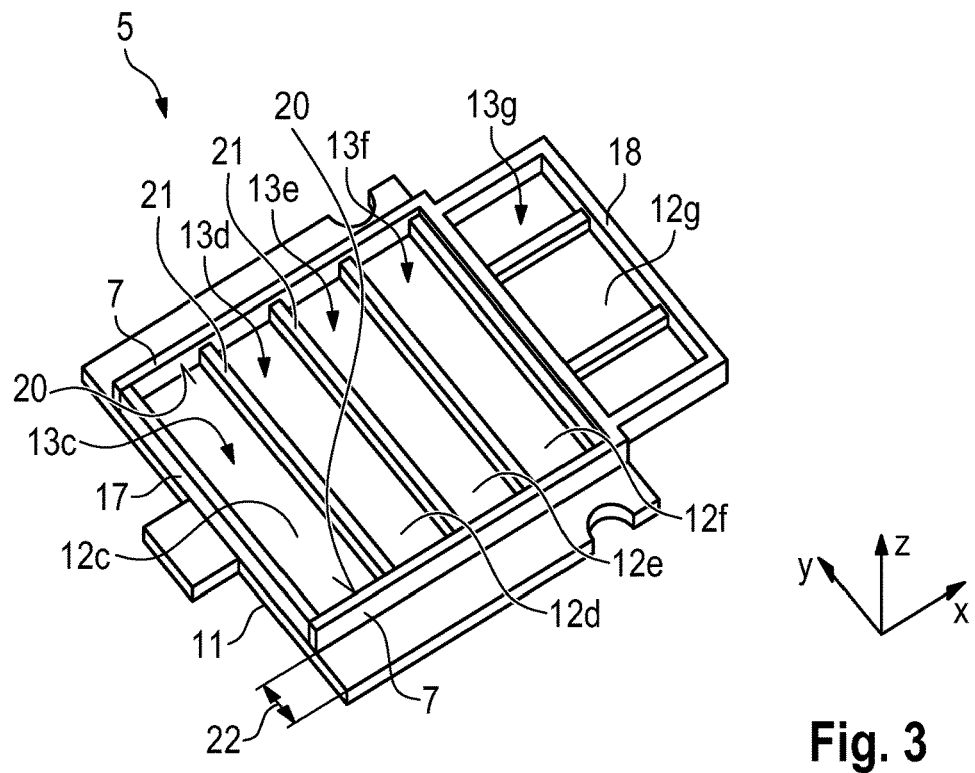
FIG. 3 is a perspective illustration of an embodiment of a battery housing according to the invention without the housing cover.
Figure 4:
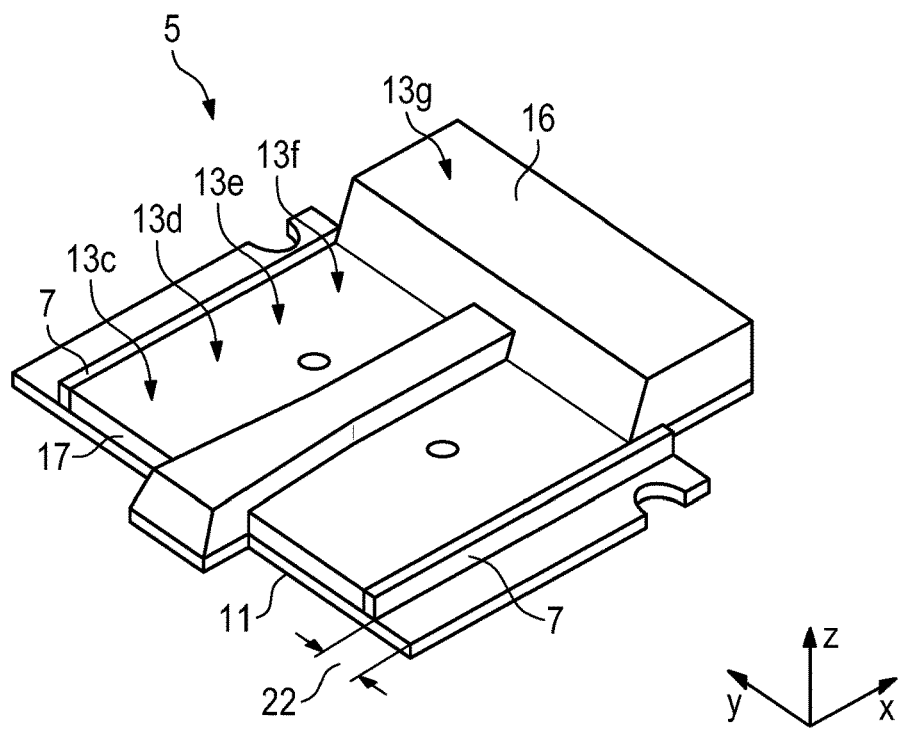
FIG. 4 is a perspective illustration of the embodiment of the battery housing according to the invention according to FIG. 3 with the housing cover.

The battery housing 5 according to the embodiment of FIG. 2 is shown without the housing cover in FIG. 3, with a view onto the upper side of the housing base 11 that faces the housing interior space 10. The battery housing 5 with the housing cover 16 is shown in FIG. 4. A vertical profile of the housing cover 16 can be established by a shape of the floor of a passenger cabin of the motor vehicle 1, for example. The region of the battery housing 5 that corresponds to the sub-region 13g can be disposed below a rear seat of the motor vehicle 1, for example, such that a plurality of layers with battery modules 9 can be disposed on top of one another in the vehicle vertical direction z in this sub-region 13g. This sub-region 13g is therefore configured so as to be higher than the remaining sub-regions 13c to 13f.

The battery housing 5 has the housing lower part 6 in the form of the segmented housing base 11, as well as the housing upper part 8 of which only the lateral walls 7 as well as a front wall 17 and a rear wall 18 are illustrated here. The lateral walls 7, the front wall 17, and the rear wall 18 form a housing casing 19 of the housing upper part 8. Cross braces 21, which serve for holding the battery modules 9, are fastened to internal sides 20 of the lateral walls 7 that face the housing interior space 10. The battery modules can be fastened to the cross braces 21 and held thereon by screw-fitting, for example. The housing base segments 12c, 12d, 12e, 12f, 12g here are fastened to the cross braces 21 as well as to the housing casing 19.

A wall thickness 22 of the lateral walls 7 along the vehicle transverse direction y can be adapted to a type of the battery modules 9 used. For example, the higher an energy content of the battery module 9, the greater the wall thickness 22. On account of the lateral wall 7 having the corresponding wall thickness 22, the battery modules 9 can indeed be reliably protected against damage in the event of a lateral impact, or a lateral crash, respectively, of the motor vehicle 1.

Figure 5:
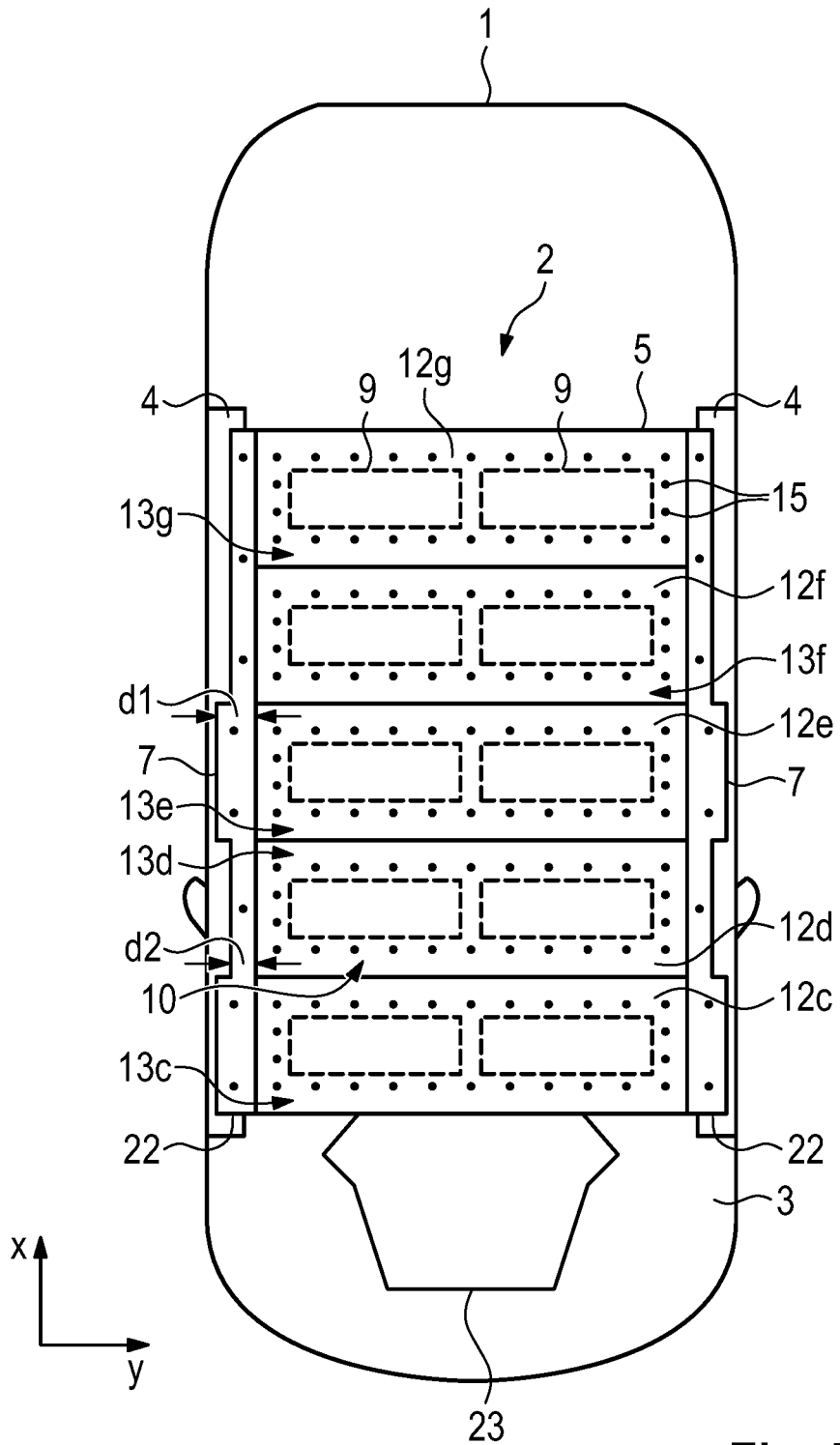
FIG. 5 is a schematic illustration of a motor vehicle having a third embodiment of a high-voltage battery according to the invention.

A motor vehicle 1 having a further embodiment of the battery housing 5 of the high-voltage battery 2 is shown in FIG. 5. The wall thickness 22 of the lateral walls 7 along the vehicle longitudinal direction x here has dissimilar values d1, d2. The lateral walls 7 of the sub-regions 13c and 13c herein are reinforced in a targeted manner, wherein the wall thickness 22 has a first value d1. The lateral walls 7 in the sub-regions 13d, 13f, 13g are not reinforced; the wall thickness 22 has a second value d2 which is smaller in comparison to the first value d1. The regions of the lateral wall 7 that correspond to the sub-regions 13c, 13e are regions which are particularly exposed to an impingement by a force in a lateral impact on the motor vehicle 1, for example. These regions of the lateral walls 7, on account of the greater wall thickness 22, have a greater stiffness.

Moreover, the battery housing 5 according to FIG. 5 has a protective guard 23 which is configured as a skid plate. It can be prevented on account of the skid plate that an obstacle close to the ground, for example a bollard, collides with the battery housing 5 when the motor vehicle 1 drives over said obstacle and on account thereof damages the high-voltage battery 2. To this end, the motor vehicle 1, by way of the protective guard 23, can slide onto the obstacle such that the battery housing 5 is moved past the obstacle. Additionally, the housing base segments 12c to 12g can be configured having dissimilar thicknesses in order for the battery modules 9 to be protected. For example, the housing base segment 12c that faces a front region of the motor vehicle 1 and the housing base segment 12g that faces a rear region of the motor vehicle can be configured having a greater thickness than the housing base segments 12d, 12e, 12f. Specifically, the front housing base segment 12c and the rear housing base segment 12g in the event of a frontal crash, or in the event of a rear impact, respectively, of the motor vehicle 1, or when driving over an obstacle, are particularly heavily affected by the impingement of force caused by the impact. These housing base segments 12c and 12g, for the protection of the battery modules 9 situated in the sub-regions 13c and 13g, are reinforced in a targeted manner and therefore have a greater stiffness. In order for a weight of the battery housing 5 not to be unnecessarily increased, the housing base segments 12d, 12e, 12f are not reinforced, since damage to the latter during the crash or while driving over the obstacle is improbable.

LIST OF REFERENCE SIGNS

1 Motor vehicle
2 High-voltage battery
3 Underbody region
4 Rocker panel
5 Battery housing
6 Housing lower part
7 Lateral walls
8 Housing upper part 9 Battery module
10 Housing interior space
11 Housing base
12a to 12g Housing base segments
13a to 13g Sub-regions
14 Screw connection
15 Screw connection
16 Housing cover
17 Front wall
18 Rear wall
19 Housing casing
20 Internal sides
21 Cross braces
22 Wall thickness
23 Protective guard
d1, d2 Values
x Vehicle longitudinal direction
y Vehicle transverse direction
z Vehicle vertical direction

What is claimed is:

1. A battery housing for a high-voltage battery of a motor vehicle, comprising:
a housing interior space for receiving a multiplicity of battery modules;
a housing upper part and a housing lower part, which covers the housing upper part, forming the interior space, wherein
the housing lower part is configured as a segmented housing base having at least two separate housing base segments,
at least one of said at least two housing base segments is configured so as to be removable for opening the battery housing and for making accessible a sub-region of the housing interior space that is covered by said one housing base segment, and
the at least one housing base segment is fastened so as to be releasable in a non-destructive manner on the housing upper part,
at least one of the housing base segments is fastened to the housing upper part so as not to be releasable in a non-destructive manner, and
the at least one removable housing base segment is disposed in a sub-region of the battery housing that is exposed to an impingement by a force caused by an impact.

2. The battery housing according to claim 1, wherein the housing base segments are configured as plate-shaped rectangular portions which extend across a width of the battery housing and which are disposed beside one another in a longitudinal direction of the battery housing.

3. The battery housing according to claim 1, wherein
a first housing base segment is configured having a first thickness and on account thereof has a first stiffness, and
a second housing base segment is configured having a second thickness which is greater in comparison to the first thickness and has a second stiffness which is greater in comparison to the first stiffness.

4. The battery housing according to claim 1, wherein the housing upper part comprises:
a housing casing which is formed by a front wall, a rear wall, and two lateral walls which lie opposite one another in a width direction of the battery housing,
a housing cover, and
cross braces which, for holding the battery modules, are oriented in the width direction and fastened to internal sides of the lateral walls, wherein
the removable housing base segments are fastened to the housing casing and to the cross braces.

5. The battery housing according to claim 4, wherein
the sub-regions of the housing interior space are delimited by two cross braces and/or by one cross brace and the front wall and/or by one cross brace and the rear wall, and each sub-region is covered by a housing base segment which is fastened to the housing casing and to the at least one associated cross brace.

6. The battery housing according to claim 5, wherein
the lateral walls have a profile which varies along a longitudinal direction of the battery housing and by way of which lateral wall regions of the battery housing have dissimilar stiffnesses.

7. The battery housing according to claim 4, wherein
the lateral walls have a profile which varies along a longitudinal direction of the battery housing and by way of which lateral wall regions of the battery housing have dissimilar stiffnesses.

8. The battery housing according to claim 1, wherein
the at least one removable housing base segment is fastened to the housing upper part by a screw connection.

9. The battery housing according to claim 1, wherein
the battery housing, for protecting the high-voltage accumulator in relation to a collision with an obstacle when the motor vehicle drives over the obstacle, has a protective guard.

10. A high-voltage battery for a motor vehicle, comprising:
a multiplicity of battery modules; and
a battery housing according to claim 1.

11. A motor vehicle comprising a high-voltage battery according to claim 10.

* * * * *